United States Patent [19]

Katayama

[11] Patent Number: 4,543,842
[45] Date of Patent: Oct. 1, 1985

[54] SELECT RETURN MECHANISM IN A MANUAL TRANSMISSION FOR AUTOMOTIVE VEHICLES

[75] Inventor: Nobuaki Katayama, Toyota, Japan

[73] Assignee: Toyota Jidosha Kabushiki Kaisha, Aichi, Japan

[21] Appl. No.: 477,400

[22] Filed: Mar. 21, 1983

[30] Foreign Application Priority Data

Oct. 4, 1982 [JP] Japan .................. 57-151073[U]

[51] Int. Cl.$^4$ .................. B60K 20/04; G05G 9/16
[52] U.S. Cl. .................. 74/473 P; 267/150
[58] Field of Search .................. 74/473 P, 471 XY; 267/150; 200/153 K, 6 A, 471 XY; 137/636.2

[56] References Cited

U.S. PATENT DOCUMENTS

| 1,796,106 | 3/1931 | Johnson | 74/473 P |
|---|---|---|---|
| 2,136,697 | 11/1938 | Lapsley | 74/473 P |
| 2,780,427 | 2/1957 | Keller et al. | 267/150 X |
| 3,064,493 | 11/1962 | Popovich et al. | 74/473 P |
| 3,422,697 | 1/1969 | Brown et al. | 74/473 P |
| 3,780,596 | 12/1973 | Takahashi et al. | 74/473 P |
| 4,285,250 | 8/1981 | Iizuka et al. | 74/473 P |
| 4,333,360 | 6/1982 | Simmons | 267/150 X |

FOREIGN PATENT DOCUMENTS

| 1450871 | 9/1969 | Fed. Rep. of Germany | 74/473 P |
|---|---|---|---|
| 642911 | 7/1962 | Italy | 267/150 X |

Primary Examiner—Allan D. Herrmann
Assistant Examiner—Shirish Desai
Attorney, Agent, or Firm—Parkhurst & Oliff

[57] ABSTRACT

A select return mechanism in a manual transmission comprising a cylindrical retainer having an upper opening and a partially spherical supporting portion formed at the lower end thereof, a shift lever inserted into the retainer and having a spherical supported portion supported by the supporting portion of the retainer, a pair of vertically elongated holes oppositely formed at the cylindrical wall of the retainer, a select pin inserted through the center of the supported portion of the shift lever and extending oppositely outwardly from the elongated holes of the retainer, said select pin being arranged at right angles to the shift lever, a pushing member having a partially spherical surface and fitted on the upper spherical surface of the supported portion, a spring for pressing the supported portion (through) the pushing (member) against the supporting portion of the retainer, and a spring retaining member provided at the upper end of the retainer and surrounding the shift lever, the spring being a coil spring inserted between the spring retaining member and the select pin in a precompressed condition.

10 Claims, 9 Drawing Figures

4,543,842

SELECT RETURN MECHANISM IN A MANUAL TRANSMISSION FOR AUTOMOTIVE VEHICLES

BACKGROUND OF THE INVENTION

This invention relates to a select return mechanism in a manual transmission for automotive vehicles.

Generally, speed change operation of a manual transmission for automotive vehicles is carried out by a selecting operation of a shift lever mounted in an automotive compartment and subsequently by a shifting operation thereof. In order to ensure proper selecting and shifting operations of the shift lever, when the shift lever is returned from its shift position to its select-operable position, it is required to steadily return to a fixed select return position. For this requirement, a select load characteristic as shown in FIG. 2 is generally determined. As shown in FIG. 1, when the shift lever is in the shiftable positions to the first and the second speed gears or to the fifth speed and the reverse gear, it is designed to surely return to the select return position N, which is the shiftable position to the third and the fourth speed gears. As shown in FIG. 2, the select load increases from the initial stage of the select operation to the terminal stage thereof, and the initial select load P is set at both sides of the select return position N. Conventionally, there are provided two select return springs at both sides of a part of the shift lever for returning the shift lever to the select return position (the neutral position). Accordingly, it is required to provide a sufficient space for installing the select return springs. Further, the structure of the select return mechanism is complicated and it is costly to manufacture.

SUMMARY OF THE INVENTION

Accordingly it is a primary object of the present invention to provide a select return mechanism in a manual transmission which has a simple structure and may steadily achieve the desired select return characteristics of the shift lever.

Another object of the present invention is to provide a select return mechanism in a manual transmission which may be compactly manufactured with reduced cost.

Briefly, a select return mechanism in a manual transmission according to the present invention comprises a cylindrical retainer having an upper opening and a partially spherical supporting portion formed at the lower end thereof, a shift lever inserted into the retainer and having a spherical supported portion supported by the supporting portion of the cylindrical retainer, a pair of vertically elongated holes oppositely formed at the cylindrical wall of the retainer, a select pin passing through the center of the supported portion of the shift lever and extending oppositely outwardly from the elongated holes of the retainer, said select pin being arranged at right angles to the shift lever, a pushing member having a partially spherical surface and fitted on the upper spherical surface of the supported portion of the shift lever, means for pressing the supported portion through the pushing member to the supporting portion of the retainer, a spring retaining member provided at the upper end of the retainer and surrounding the shift lever and a coil spring inserted between the spring retaining member and the select pin in a precompressed condition.

With this arrangement, the supported portion of the shift lever is supported by the partially spherical seat of the supporting portion of the retainer and is downwardly biased by the coil spring through the pushing member, but without binding the shift lever (which is disadvantageous because of vibration or any other factors). Both ends of the select pin are loosely inserted through the elongated holes, so that the select pin may rotate about its axis and incline in the upward and downward directions, thereby enabling shift and select operations of the shift lever. Since the coil spring is precompressed, even when the select pin is inclined to the maximum level the normally desired characteristics of the select load may easily be achieved, and the shift lever is steadily returned to the select return position or the neutral position.

The invention will be more fully understood from the following detailed description and appended claims when taken with the drawings.

DETAILED DESCRIPTION OF THE PREFERRED EMBODIMENTS

Figure 3:
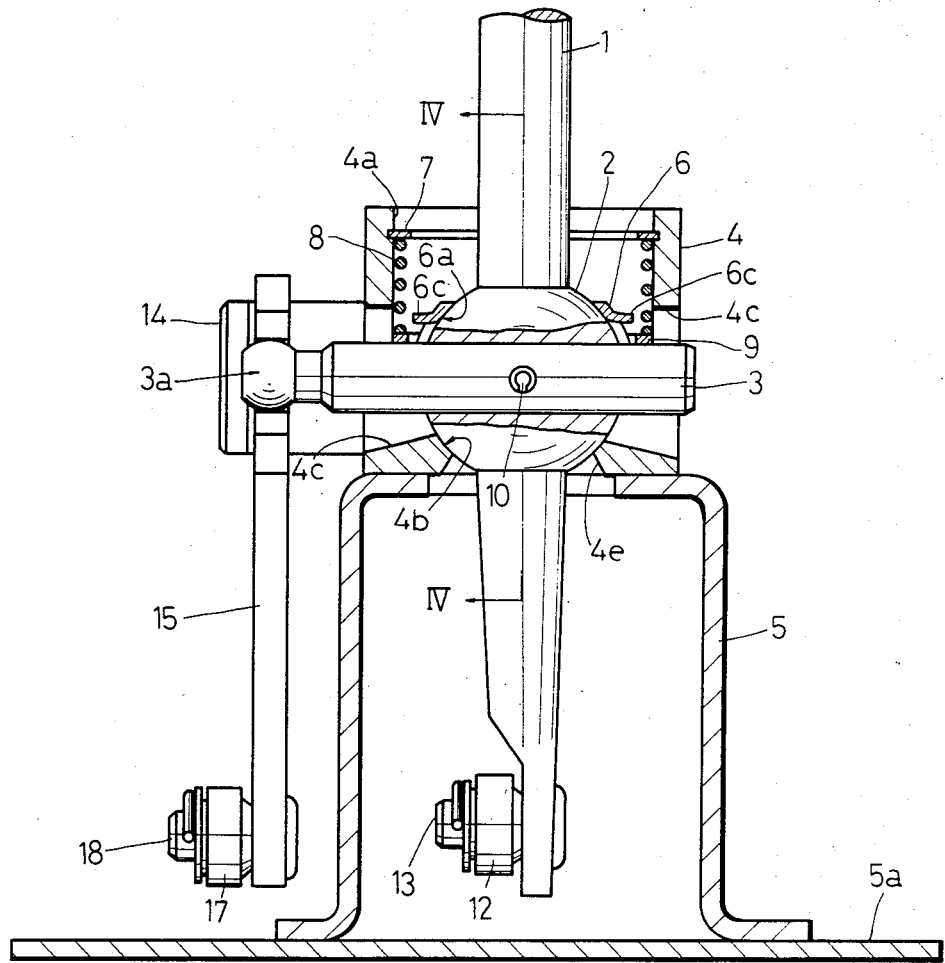
FIG. 3 is a vertical sectional view of the select return mechanism of a first embodiment of the present invention.

Referring now to FIG. 3, reference numeral 1 generally designates a shift lever of a floor shift type which is provided with a spherical supported portion 2 at its lower portion. Reference numeral 3 designates a select pin inserted through a center of the supported portion 2 and extending at right angles to the axis of the shift lever 1 and passing through the spherical surface of the supported portion 2. The select pin 3 is formed with a spherical portion 3a at its one end (the left-hand end in FIG. 3).

Figure 4:
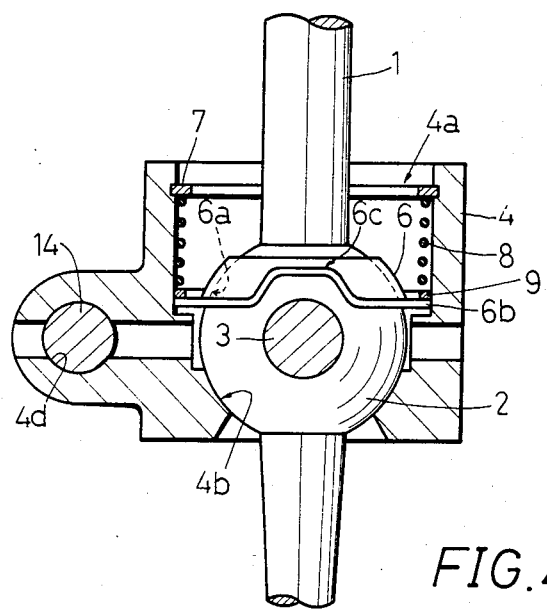
FIG. 4 is a cross-sectional view taken along the line IV—IV in FIG. 3.
Figure 5:
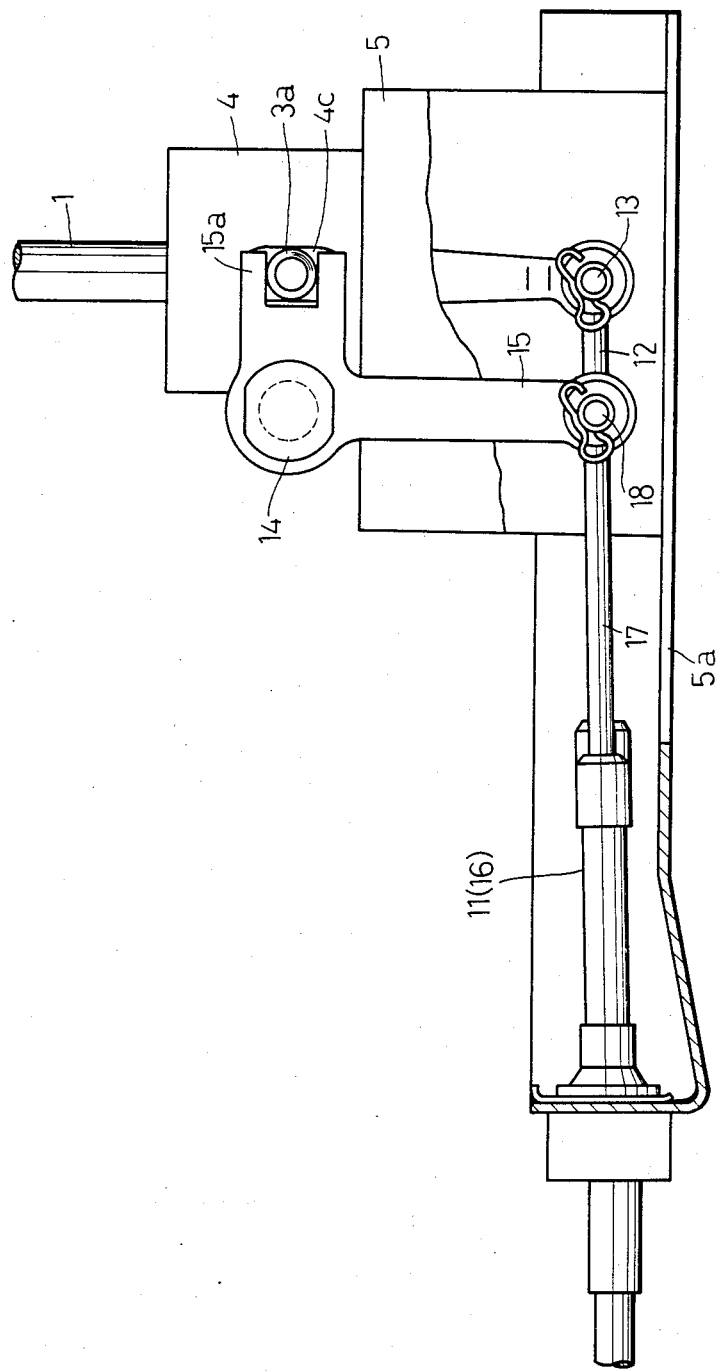
FIG. 5 is a side view of the support of the shift lever.
Figure 6:
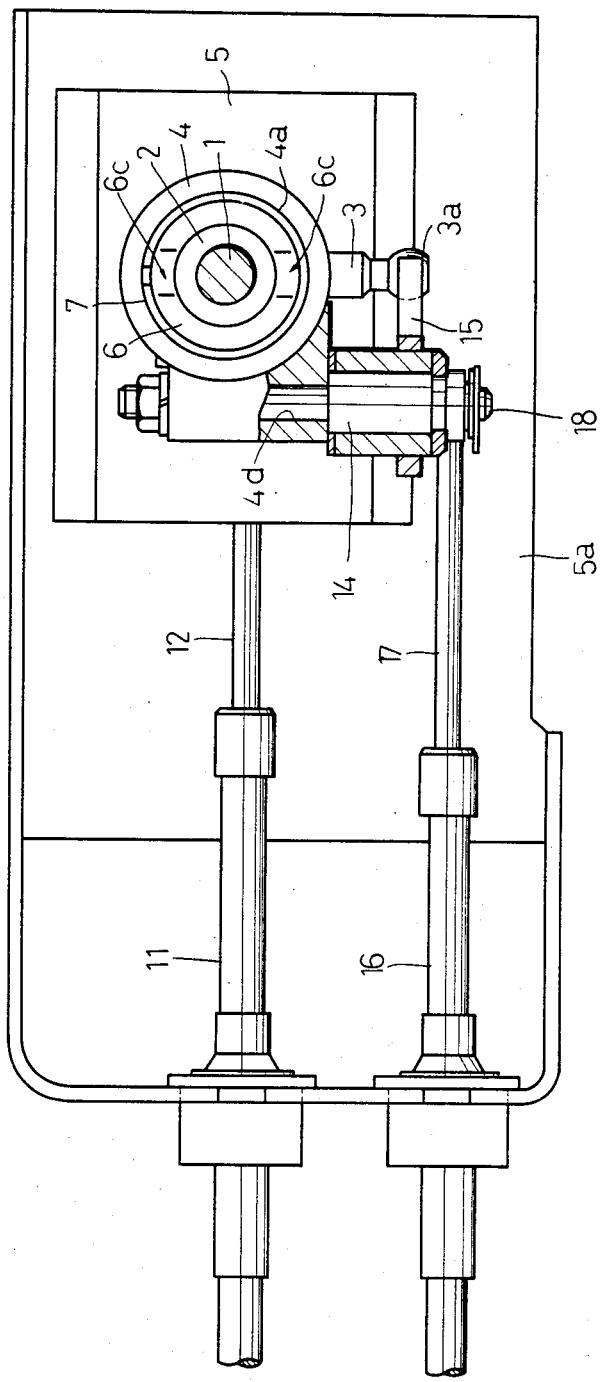
FIG. 6 is a plan view of FIG. 5.

Reference numeral 4 designates a cylindrical retainer for the shift lever 1, which retainer is fixed on the upper surface of a bed member 5, as is also shown in FIGS. 5 and 6. A base member 5a of the bed member 5 is fixed on an automotive body (not shown) by a suitable means. The retainer 4 is provided with an upper opening 4a opened through its central portion and with a supporting portion 4b at its lower end for serving as a seat of the spherical supported portion 2. The supporting portion 4b is provided with a through-hole 4e at its central portion. A pair of vertically elongated through-holes 4c are provided at opposed positions of the cylindrical wall of the retainer 4. The select pin 3 is freely inserted into the elongated through-holes 4c. The widths of the through-holes 4c are set to be slightly larger than the outside diameter of the select pin 3. The retainer 4 is also formed with an aperture 4d into which a lock pin 14 is inserted, as will be hereinafter described. (See FIG. 4).

As is apparent from FIG. 4, a pushing plate 6 is fitted on the upper spherical surface of the supported portion 2 of the shift lever 1 in the cylindrical opening 4a of the retainer 4. The pushing plate 6 has a partially spherical contact surface 6a abutting against the upper spherical surface of the supported portion 2 and a flange portion 6b formed at its lower outer circumference. The flange portion 6b is formed with opposite upper curved portions 6c facing the select pin 3 for preventing the flange portion 6b from contacting with the select pin 3.

After the shift lever 1 is inserted into the cylindrical opening 4a, the lower surface of the supported portion 2 abuts against the spherical seat of the supporting portion 4b and the upper surface of the supported portion 2 is contacted with the contact surface 6a of the pushing plate 6. A spacer ring 9 is located on the flange portion 6b of the pushing plate 6 and a snap ring 7 is fitted into the inner cylindrical surface of the retainer 4 in the vicinity of the upper end of the cylindrical opening 4a. A coil spring 8 is inserted between the spacer ring 9 and the snap ring 7 in a precompressed condition, whereby the supported portion 2 of the shift lever 1 is biased against the supporting portion 4b of the retainer 4 through the pushing plate 6. As is apparent from the foregoing description, the select pin 3 is always kept in opposed relation with and away from the upper curved portions 6c. Reference numeral 10 as designated in FIG. 3 is a pin for locking the select pin 3 to the supported portion 2.

As shown in FIG. 5, the lower end of the shift lever 1 is connected by a connecting pin 13 to one end of an inner cable rod 12 of a shifting cable 11, one end of which is fixed to the base member 5a of the bed member 5. The spherical portion 3a of the select pin 3 is connected to a forked portion 15a formed at one end of a select bell crank 15. As shown in FIG. 6, the select bell crank 15 is rotatably supported by the pin 14 fixedly inserted into the aperture 4d of the retainer 4. The other end of the select bell crank 15 is connected by a connecting pin 18 to one end of an inner cable rod 17 of a selecting cable 16, one end of which is fixed to the base member 5a of the bed member 5.

As is apparent from the foregoing description, the supported portion 2 of the shift lever 1 is supported by the spherical seat of the supporting portion 4b of the retainer 4 and is downwardly biased by the coil spring 8 through the pushing plate 6, without binding the shift lever 1 (because of vibration or any other factors). Both ends of the select pin 3 are loosely inserted through the elongated holes 4c, so that the select pin 3 may rotate about its axis and incline in the upward and downward directions, thereby enabling shift and select operations of the shift lever 1.

Figure 1:
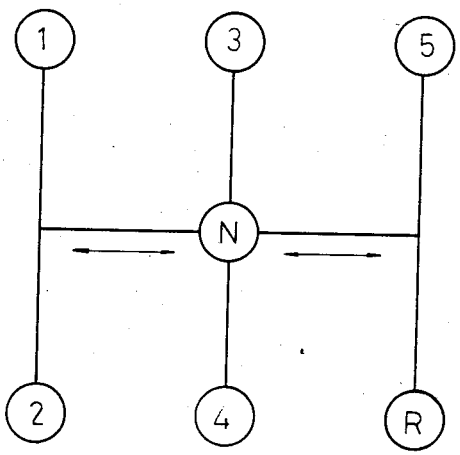
FIG. 1 shows a shift pattern of a manual transmission having five forward speed gears and one reverse speed gear.
Figure 2:
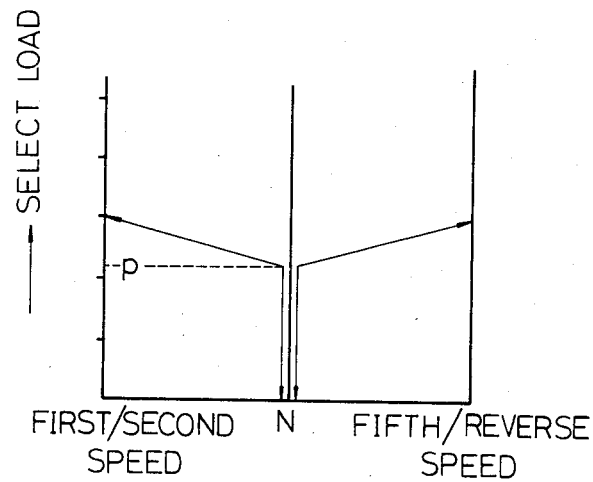
FIG. 2 shows the select load characteristic of the manual transmission in FIG. 1.
Figure 7:
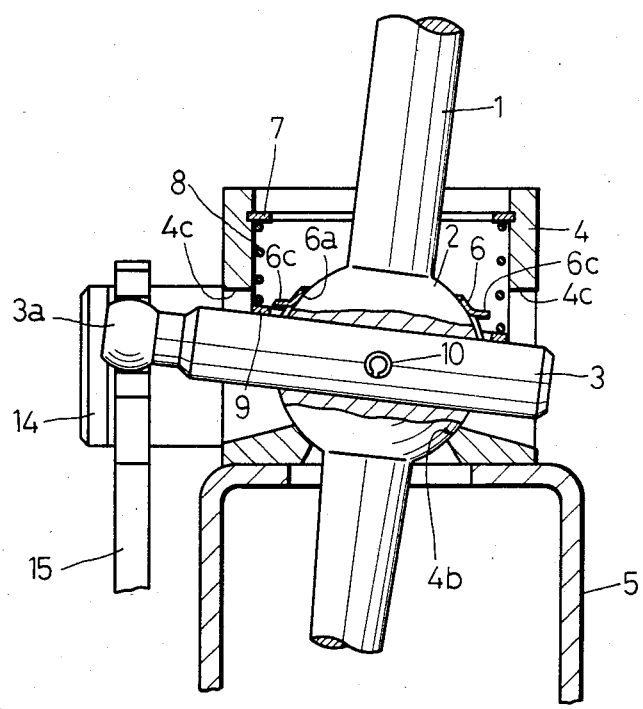
FIG. 7 is a vertical sectional view of the select return mechanism of FIG. 3 in a select-operated condition

In operation, when the shift lever 1 in the select return position N is select-operated, the select pin 3 is inclined together with the shift lever 1 as shown in FIG. 7. Owing to this inclination, the spacer ring 9 is upwardly urged at its left-hand side by the upward inclination of the select pin 3 as viewed in FIG. 7, thereby compressing the coil spring 8. On the other hand, the right-hand side of the select pin 3 is downwardly inclined, thereby stretching the coil spring 8 from the originally precompressed condition thereof. Accordingly the coil spring 8 acts to downwardly bias only the left-hand side of the select pin 3. Furthermore, the coil spring 8 is precompressed even when the select pin 3 is inclined to the maximum level. Thus, with this arrangement, the characteristics of the select load as shown in FIG. 2 may be easily achieved. Accordingly, the coil spring 8 is operative to return the shift lever 1 to the select return position N. Even when the shift lever 1 is inclined in the direction opposite to that shown in FIG. 7 by the selecting operation, the coil spring 8 is operative to return the shift lever 1 to the select return position N in a fashion similar to the aforementioned operation, thereby achieving the characteristics of the select load as shown in FIG. 2. Accordingly, when the shift lever 1 is moved from the shift position for the first or the second speed gear to the select-operable position by the shifting operation, the shift lever 1 is steadily returned to the select return position N.

As is hereinabove described, the return force of the shift lever 1 to the select return position N is directly applied to the select pin 3 in this embodiment, thereby simplifying the structure of the select return mechanism and making the same compact. Further, it is remarkably advantageous that the resilient force of the coil spring 8 serves as a return force of the shift lever 1 and a biasing force against the pushing plate 6. When the select pin 3 is inclined by the selecting operation of the shift lever 1, the select bell crank 15 is rotated about the lock pin 14 through the spherical portion 3a of the select pin 3, thus transmitting the movement of the shift lever 1 to the inner cable rod 17 of the selecting cable 16. On the other hand, when the select pin 3 is rotated about the axis by the shifting operation of the shift lever 1, the movement of the shift lever 1 is transmitted to the inner cable rod 12 of the shifting cable 11.

Figure 8:
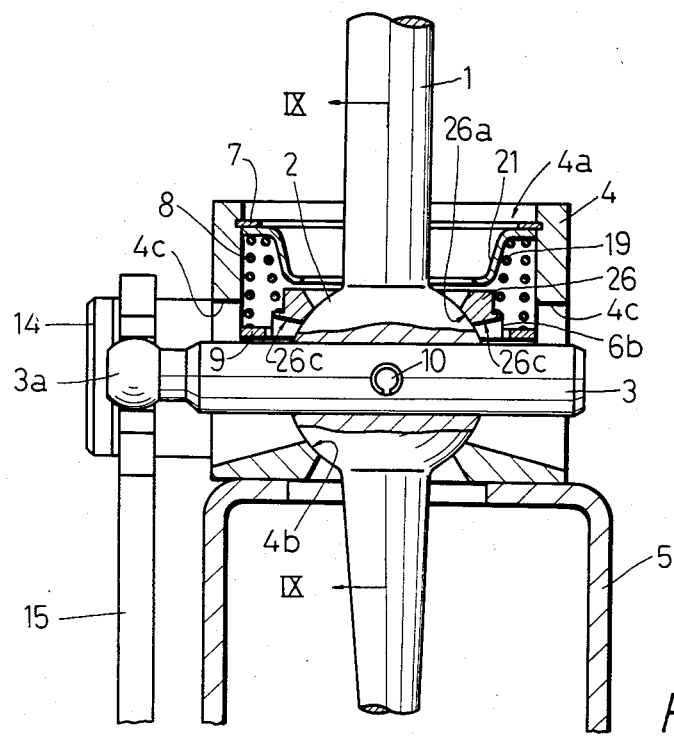
FIG. 8 is a vertical sectional view of the select return mechanism of a second preferred embodiment of the present invention.
Figure 9:
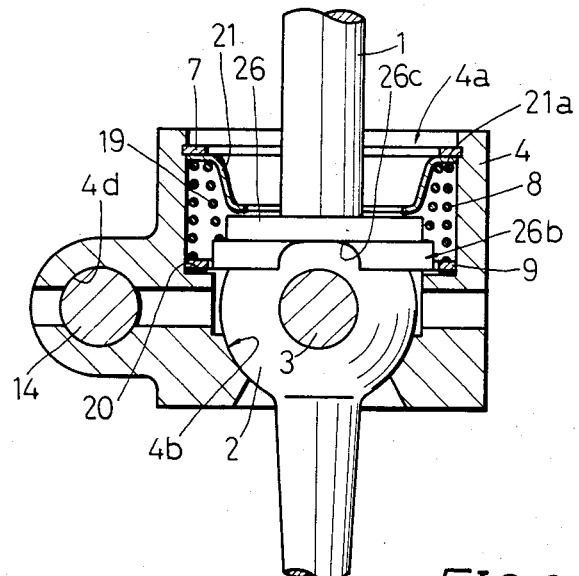
FIG. 9 is a cross-sectional view taken along the line IX—IX in FIG. 8.

Referring next to FIGS. 8 and 9, which show another embodiment of the invention, there is provided a conical spring 19 for downwardly biasing a block-like pushing member 26. The pushing member 26 has a partially spherical contact surface 26a pushing the upper spherical surface of the supported portion 2 of the shift lever 1. The retainer 4 is formed with a stepped portion 20 at an approximately intermediate position of the cylindrical hole 4a. The outside diameter of the flange portion 26b of the pushing member 26 is designed to be smaller than the inside diameter of the spacer ring 9. The flange portion 26b is formed with opposite cut away portions 26c facing to the select pin 3. A dish-like or frusto-conical spring holder 21 having a flange 21a is inserted into the cylindrical hole 4a of the retainer 4 and is situated directly under and in contact with the snap ring 7. The conical spring 19 is fitted between the flange 21a of the spring holder 21 and the flange portion 26b of the pushing member 26 under a desirably precompressed condition. The coil spring 8 is fitted between the flange 21a of the spring holder 21 and the spacer ring 9, and the spacer ring 9 is positioned above the stepped portion 20 of the cylindrical hole 4a and is in contact with the select pin 3 in the same manner as with the first embodiment. Other constitution is substantially identical with that in the first embodiment.

According to the second embodiment, as the dimension of the coil spring 8 is more freely selected than the first embodiment, more greatly suitable characteristics of the select load may be achieved in addition to the effect obtained in the first embodiment.

While the invention has been described with reference to a few preferred embodiments thereof, it is to be understood that modifications or variations may be easily made without departing from the scope of this invention which is defined by the appended claims.

What is claimed is:

1. A select return mechanism in a manual transmission for automotive vehicles comprising:
   a cylindrical retainer having an upper opening and a partially spherical supporting portion formed at a lower end thereof;
   a shift lever inserted into said retainer and having a spherical supporting portion formed at a lower end thereof
   said supported portion being supported by said supporting portion of said retainer;
   a pair of vertically elongated holes formed at opposite sides of a cylindrical wall of said retainer;
   a select pin passing through a center of said supported portion at right angles to said shift lever and extending oppositely outwardly from said elongated holes;
   a pushing member having a partially spherical surface fitted to an upper spherical surface of said supported portion;
   a spring retaining member provided at an upper end of said retainer and surrounding said shift lever; and
   a precompressed coil spring between said spring retaining member and said select pin for pressing against said select pin to bias said shift lever towards a neutral position.

2. The select return mechanism as defined in claim 1, further comprising a spacer ring interposed between said coil spring and said select pin, said coil spring indirectly pressing against said select pin through said spacer ring.

3. The select return mechanism as defined in claim 2, wherein said pushing member is formed of a planar material and has a flange portion extending outwardly from a lower end thereof, said flange portion being formed with a pair of non-contact portions oppositely arranged and facing said select pin to prevent said flange portion from contacting said select pin, said spacer ring being located on said flange portion, and said coil spring also serving indirectly to press said supported portion against said supporting portion through said spacer ring and said pusher member.

4. The select return mechanism as defined in claim 3, wherein said non-contact portions are curved upwardly.

5. The select return mechanism as defined in claim 1, wherein said spring retaining member is a snap ring fitted to an inside surface of said retainer.

6. The select return mechanism as defined in claim 2, wherein said pushing member comprises a block-like shape formed with an outwardly extending circular flange portion, said flange portion being formed with a pair of non-contact portions oppositely arranged and facing said select pin to prevent said flange portion from contacting said select pin, and with an outside diameter of said flange portion being smaller than an inside diameter of said spacer ring, and wherein a pressing means comprising a second coil spring is inserted between said flange portion of said block-like pushing member and said spring retaining member indirectly to press said supported portion against said supporting portion through said spacer ring and said pushing member.

7. The select return mechanism as defined in claim 6, wherein said non-contact portions are cut away from said flange portion.

8. The select return mechanism as defined in claim 6, wherein said spring retaining member comprises a snap ring fitted to an upper inside surface of said retainer and a dishlike spring holder situated directly under said snap ring and surrounding said shift lever, whereby said spring holder is prevented from upward motion and said first and second coil springs are retained by said spring holder at their upper ends.

9. The select return mechanism as defined in claim 1, further comprising a pin inserted through the center of said supported portion of said shift lever to connect said support portion to said select pin.

10. The select return mechanism as defined in claim 1, further comprising means for indirectly pressing said supported portion against said supporting portion through said pushing member.

* * * * *